(12) United States Patent
Knudsen et al.

(10) Patent No.: US 7,116,777 B2
(45) Date of Patent: Oct. 3, 2006

(54) TERMINATION FRAME WITH MODULES AND METHOD

(75) Inventors: Clinton M. Knudsen, St. Louis Park, MN (US); Gordon L. Wilson, McKinney, TX (US); Jaxon D. Lang, Chaska, MN (US); Todd A. Wheeler, Burnsville, MN (US); David Anthony Durand, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 784 days.

(21) Appl. No.: 10/117,438

(22) Filed: Apr. 5, 2002

(65) Prior Publication Data

US 2003/0190035 A1 Oct. 9, 2003

(51) Int. Cl.
*H04M 3/00* (2006.01)
*H04M 5/00* (2006.01)
*H05K 7/20* (2006.01)

(52) U.S. Cl. .................. 379/325; 361/690; 370/503; 375/224

(58) Field of Classification Search ................ 379/325; 361/690; 375/224; 370/503
See application file for complete search history.

(56) References Cited

U.S. PATENT DOCUMENTS 5,146,474 A * 9/1992 Nagler et al. ............... 375/224
5,450,272 A * 9/1995 Van Gaal et al. ........... 361/690
6,167,062 A * 12/2000 Hershey et al. ............. 370/503

OTHER PUBLICATIONS

Ericsson Network Technologies AB, High Capacity Fiber Distr.; Frame EN/LZT 108 1095 Rev A, 2 pages (date unknown).

Telect, Inc., Advanced Distribution Frame, 047056, 8 pages (Jun. 2001).

(Continued)

*Primary Examiner*—Wing Chan
*Assistant Examiner*—Thjuan P. Knowlin
(74) *Attorney, Agent, or Firm*—Merchant & Gould P.C.

(57) ABSTRACT

The present invention relates to a telecommunications connection module including a housing and connection locations mounted to a front face of the housing. The connection locations are removably mounted to the front face allowing access to an interior side of the connection locations from outside the housing and arranged to two rows. A shelf divide the interior of the housing into two spaces allowing cables to be directed to one or the other of the rows of connection locations. The housing may also include integral mounting recesses for mounting the housing to a telecommunications equipment rack. The rear of the housing may also include a removable portion and angled portions adjacent the sides which are offset toward the front face. The present invention also relates to a telecommunications connection system including a rack and at least one connection module mounted to the rack, the rack including a front and a rear cable management structure. The rear cable management structure includes at least two vertical cable channels, one of which is adapted to manage cable which do not extend from modules mounted to the equipment rack. The present invention also relates to a method of installing a new equipment rack into an existing telecommunication equipment installation into a gap in the existing lineup which is narrower than the existing equipment racks. The new rack includes a rear vertical cable channel for managing cables extending from devices mounted in adjacent or nearby equipment racks but which are not connected to the new rack.

32 Claims, 12 Drawing Sheets

OTHER PUBLICATIONS

ADC Telecommunications, Inc., Network Connectivity Solutions, M143, pp. 97-127 (Feb. 2001).
ADC Telecommunications, Inc., FL 2000 Products, 803, 35 pages (Dec. 2000).
ADC Telecommunications, Inc., Next Generation Frame, 832, 8 pages (Dec. 2000).
ADC Telecommunications, Inc., Fiber Distribution Frame Products, 804, pp. 1-10 (Jul. 2001).

* cited by examiner

TERMINATION FRAME WITH MODULES AND METHOD

FIELD OF THE INVENTION

The present invention relates to termination frames and modules for mounting to the frame to provide connections between telecommunications cables.

BACKGROUND OF THE INVENTION

In telecommunications infrastructure installations, equipment for switching, cross-connecting and inter-connecting a variety of devices is used. Much of these devices are installed in telecommunications equipment racks to permit organized, high-density installations to be achieved in limited space available for equipment. Due to the increasing demand for telecommunications system capacity, it is desirable to increase the density of connections within a given space that can be achieved. One approach to increasing the density of connections within an installation is to utilize space within the footprint of the rack which previously was not used. At the same time, it is desirable to ensure that cables leading to and from the equipment mounting within the installation are adequately managed and that sufficient cable management structures are provided.

Within a single telecommunications equipment installation, it may be desirable to provide connection modules and cable management structures for traditional copper, high speed copper and optical fiber.

SUMMARY OF THE INVENTION

The present invention relates to a telecommunications connection module including a plurality of connection locations on a front of a housing for connecting telecommunications cables. The plurality of connection locations are arranged in two vertically spaced apart rows and an interior of the housing is divided by a shelf into first and second spaces so that cables entering the first space are directed to the first row of connection locations and cables entering the second space are directed to the second row of connection locations.

The present invention also relates to a telecommunications connection module including a plurality of connection locations on a front of a housing for connecting telecommunications cables, where a top and opposing sides of the housing cooperate to form mounting recesses for mounting the module to a telecommunications equipment rack.

The present invention also relates to a telecommunications connection module including a plurality of connection locations on a front of a housing for connecting telecommunications cables, where a portion of a rear of the housing is removable and portions of the rear adjacent opposing sides of the housing are offset toward a front of the housing.

The present invention further relates to a telecommunications connection system including an equipment rack and at least one connection module mounted to the rack, the rack including a first cable management structure at a rear of the rack providing first and second vertical cable channels and a second cable management structure at a front of the rack. The first vertical cable channel at the rear of the rack are adapted to manage cables extending to the connection modules mounted to the rack and the second vertical cable channel adapted to manage cables not connected to modules on the rack.

The present invention also relates to a method of adding a new equipment rack to a telecommunications equipment installation including the installation of the new rack into a gap in the installation narrower than the existing adjacent racks in that installation.

The new rack includes a second vertical cable channel for managing telecommunications cables extending from devices mounted to existing equipment rack which are not connected to devices mounted in the new rack.

A variety of advantages of the invention will be set forth in part in the detailed description that follows and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Reference will now be made in detail to the exemplary aspects of the present invention that are illustrated in the accompanying drawings. Wherever possible, the same reference numbers will be used throughout the drawings to refer the same or like parts.

Figure 1:
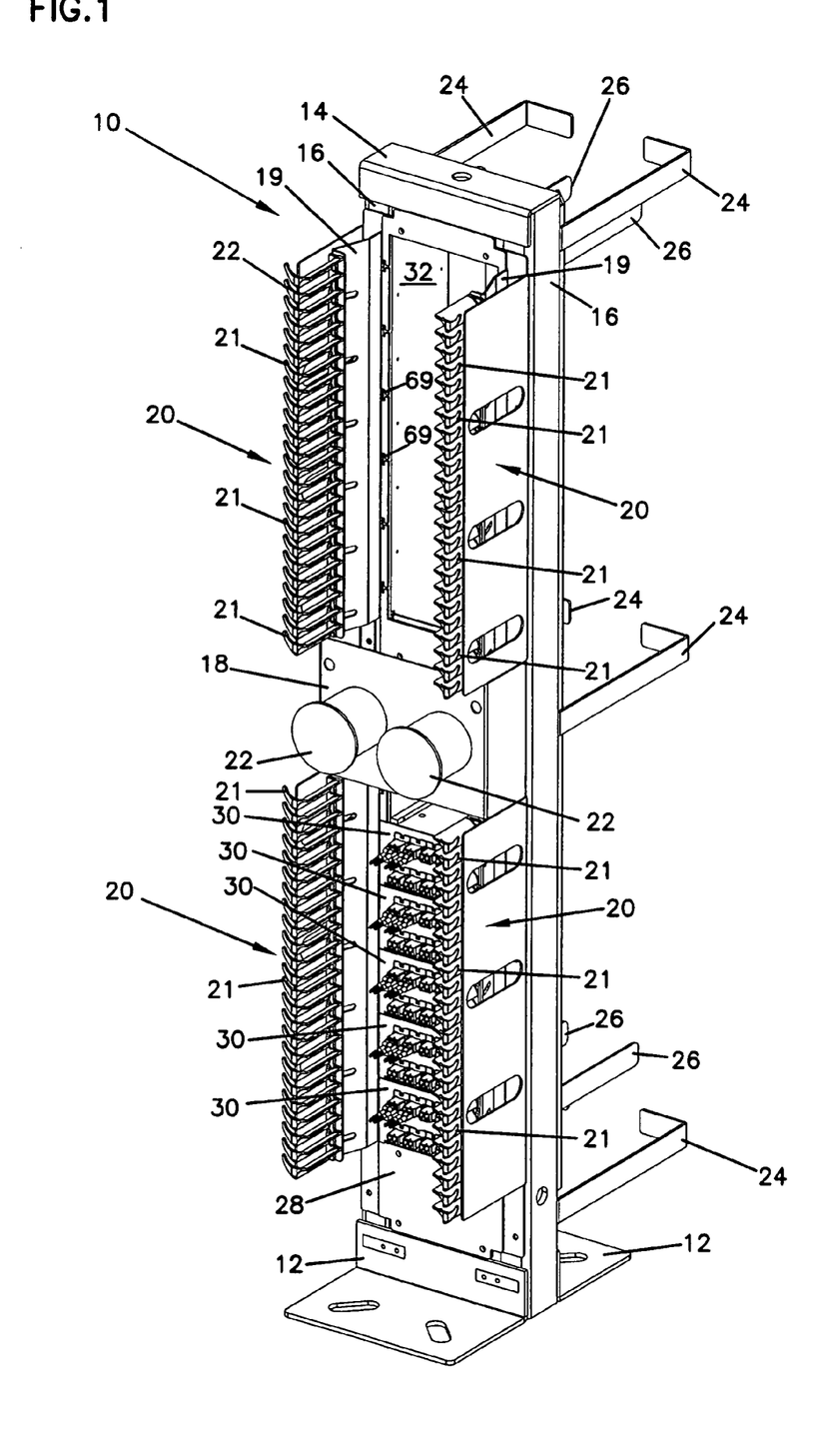
FIG. 1 is a front perspective view of a first embodiment of a telecommunications equipment rack in accordance with the present invention.

Telecommunications equipment rack 10 shown in FIG. 1 receives and manages optical fiber terminations. Rack 10 preferably has a narrow footprint to permit its installation in telecommunications installation where space is limited or into spaces within existing telecommunications installations which are too narrow for wider equipment racks which are well known in the telecommunications industry. As shown in FIGS. 1 through 7, rack 10 is approximately eight inches wide at a maximum width 36. Rack 10 may also be constructed to a maximum width of between six inches and ten inches, to allow rack 10 to fit within spaces in narrower than existing racks.

Figure 1A:
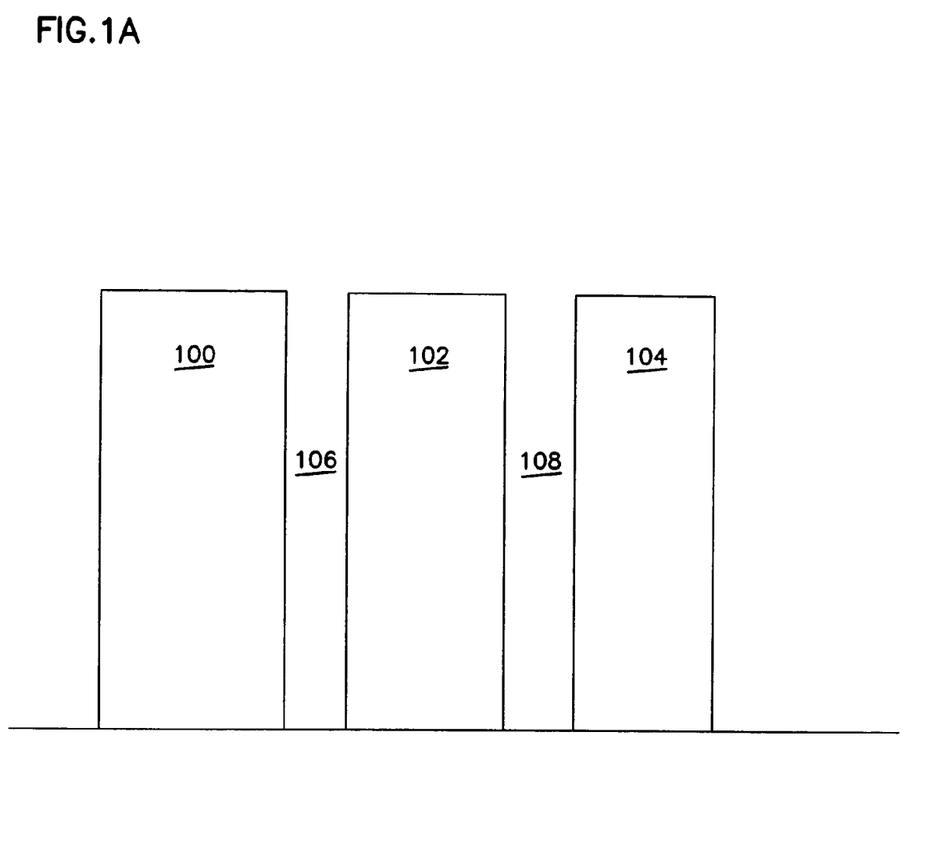
FIG. 1A is a schematic representation of a telecommunications equipment installation.

FIG. 1A shows a schematic of an existing telecommunications installation including a first existing rack 100, a second existing rack 102 and a third existing rack 104 arranged in a row. Racks 100, 102 and 104 may be standardized widths of nineteen or twenty-three inches or may be some other non-standard width. Racks such as racks 100, 102 and 104 may include a pair of vertical supports and define a plurality of mounting spaces between the supports for mounting telecommunications devices. Racks 100, 102 and 104 are mounted adjacent to one another but a gap 106 and a gap 108 are left between the adjacent racks, often to provide space extending telecommunications cables extending to, from and between the devices mounted to racks 100, 102 and 104. Gaps 106 and 108 may be considerably narrower than the width of racks 100, 102 or 104. Often, gaps 106 or 108 are between six and eight inches in width, much too narrower for existing racks such as 100, 102 or 104 to be installed. The devices mounted to the racks may be optical fiber devices so that the cables in gaps 106 and 108 are optical fiber cables, or the devices may be used with copper stranded cables. Cable management structures may also be installed within gaps 106 or 108 to control and protect the cables connected to the adjacent or nearby equipment racks.

Rack 10 includes a base with two flanges 12 mounted on the front and rear of a pair of vertical support 16, and a top 14. An intermediate crosspiece 18 is mounted between supports 16 approximately midway between flanges 12 and top 14, and includes a pair of cable storage spools 22 extending toward and accessible from the front of rack 10. Mounted to supports 16 between crosspiece 18 and top 14, and between flanges 12 and crosspiece 18 are side plates 20. Mounted to the front of supports 16 adjacent each side plate 20 is a front angled bracket 19, to which is mounted a plurality of cable protectors 21. Cable protectors 21 redirect telecommunications cables extending from a connection module 30 mounted to rack 10 into a front cable channel 23 defined between side plate 20, and front angled brackets 19 and cable protectors 21, while providing bend radius protection to the cables. Cable protectors 21 are shown oriented for cables extending down rack 10 from modules 30. Alternatively, cable protectors 21 could be inverted to provide bend radius protection for cables extending up rack 10 from modules 30. Front angled brackets 19 allow improved access to modules 30 and to permit modules 30 to be inserted between cable protectors 21 to be removed or mounted to rack 10. Front angled brackets 19 also provide a wider portion 25 of front cable channel 23 to provide greater space for the management and direction of cables extending from modules 30.

Figure 2:
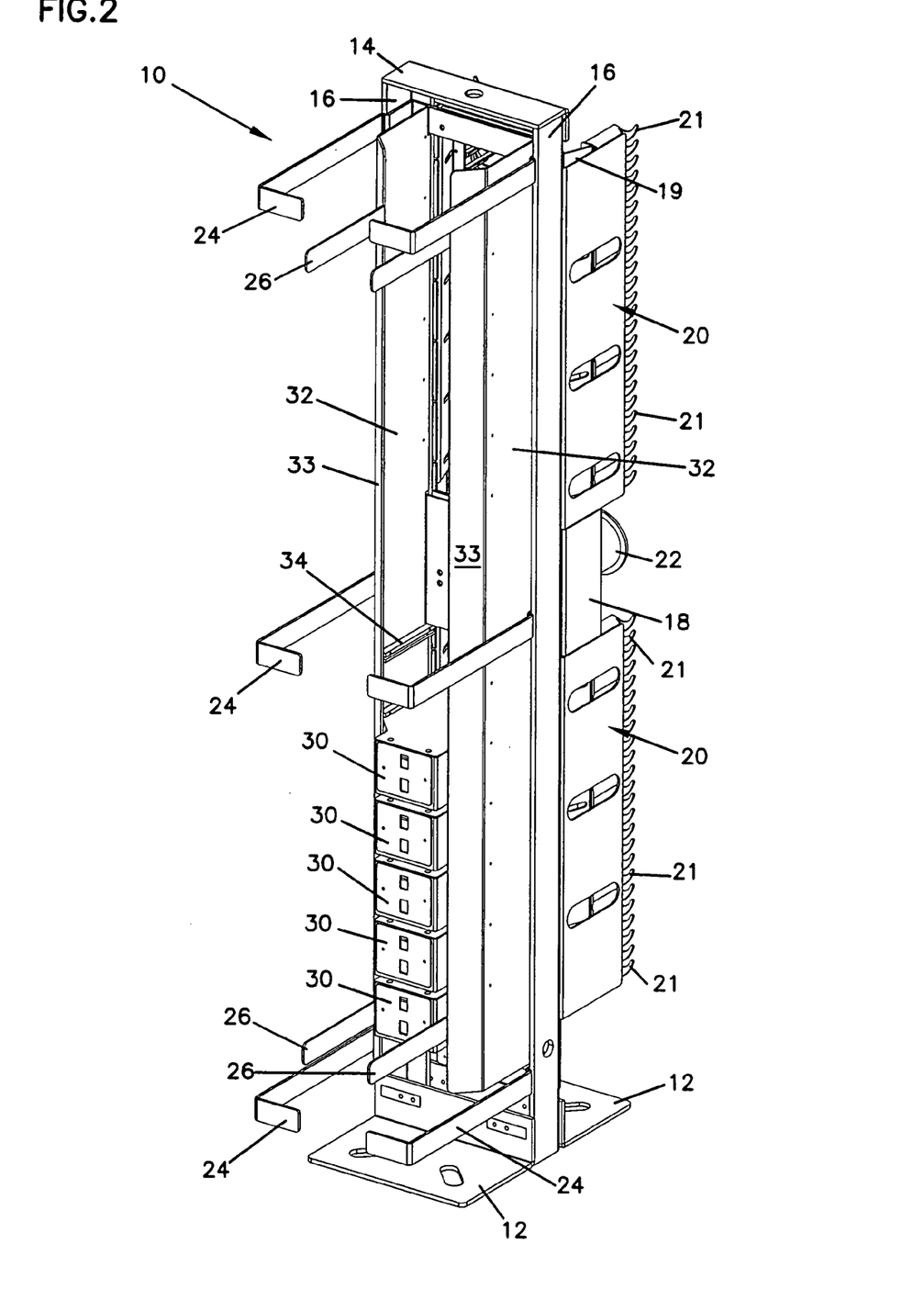
FIG. 2 is a rear perspective view of the telecommunications equipment rack of FIG. 1.
Figure 3:
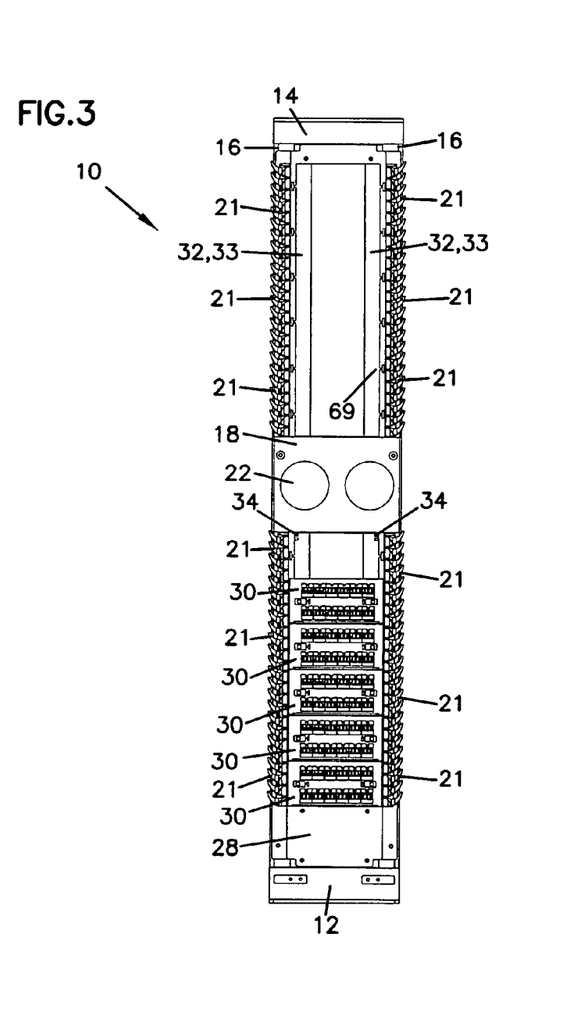
FIG. 3 is a front view of the telecommunications equipment rack of FIG. 1.
Figure 4:
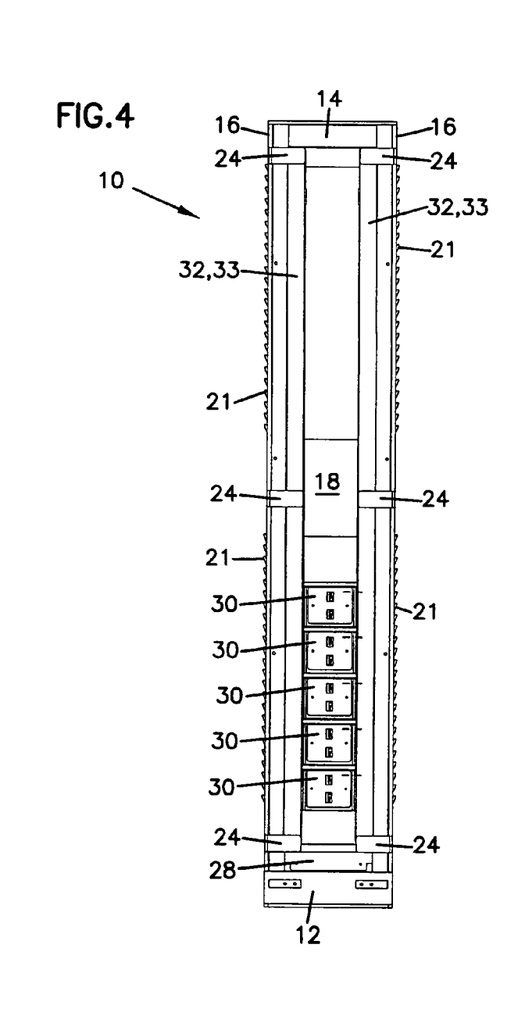
FIG. 4 is a rear view of the telecommunications equipment rack of FIG. 1.

Mounted to the rear of rack 10 are a plurality of outer brackets 24 and a plurality of inner brackets 26 which cooperate to form a cable management structure with several vertical cable channels for managing cables extending from the rear of devices mounted on rack 10. Inner brackets 26 extend from rear angled brackets 32 and cooperate with a rearmost portion of each connection modules 30 to form a first rear vertical cable channel 40 to direct cables to the modules 30 mounted to rack 10. Outer brackets 24 and inner brackets 26 cooperate to form a pair of second rear vertical cable channels 38. Second rear vertical cable channels 38 may receive and direct cables such as coax cables or other formats of cables extending from telecommunications devices mounted in adjacent or nearby racks 100, 102 and 104. Brackets 24 and 26 are spaced apart vertically so that cables may be inserted and removed from vertical cable channels 38 and 40. Brackets 24 and 26 are also sized to permit tie-offs to be used to secure cables within channels 38 and 40.

Rack 10 may be mounted within a gap in an existing telecommunications installation. Such a gap might be created by removing an existing cable management structure through which several cables from devices in adjacent or nearby telecommunications equipment racks might be extending. When the existing cable management structure us removed to permit installation of rack 10, some provision for handling the existing cables is desirable. Second rear vertical cable channel 38 provides a location where these existing cables may be managed.

Figure 5:
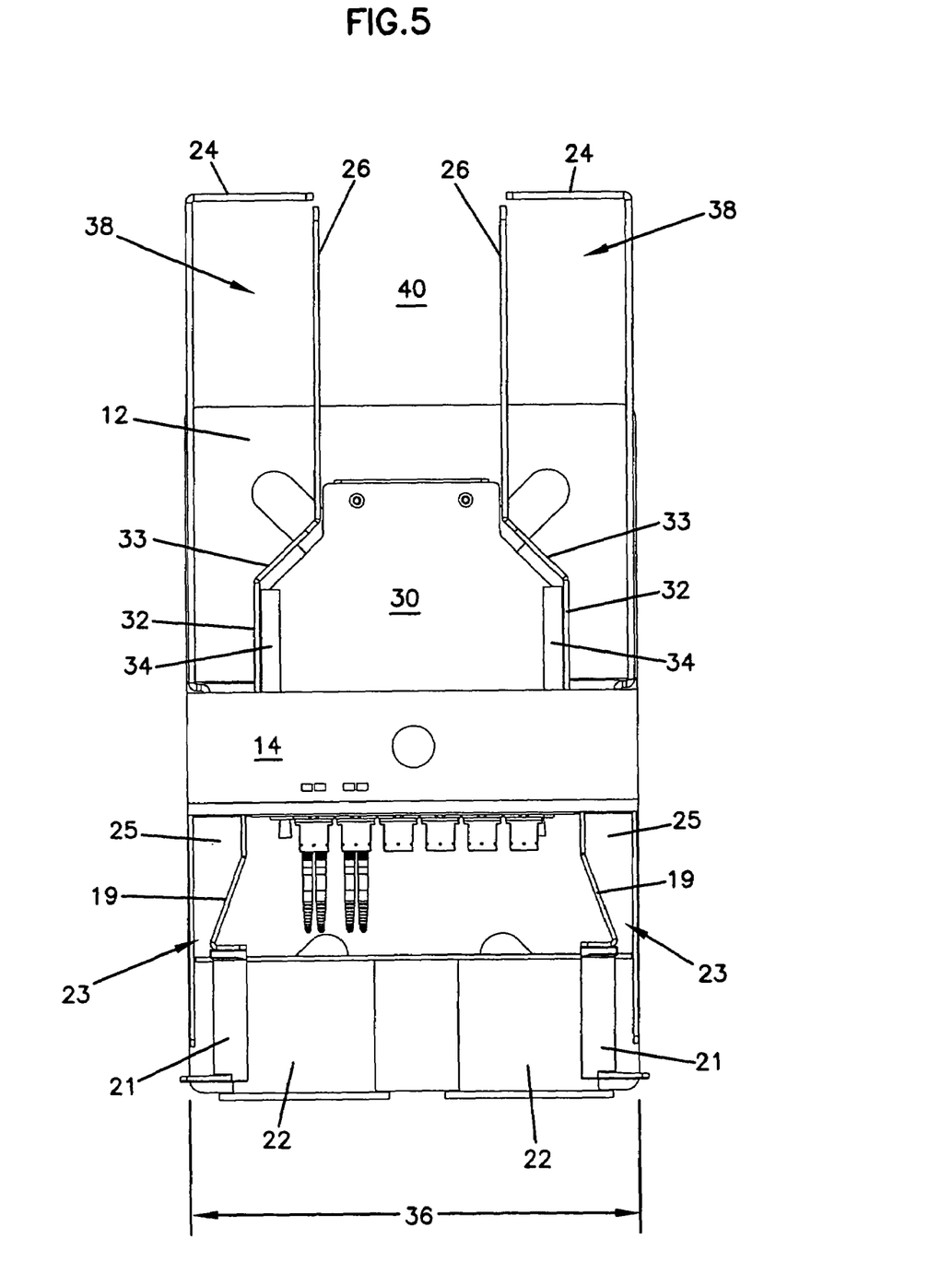
FIG. 5 is a top view of the telecommunications equipment rack of FIG. 1.
Figure 6:
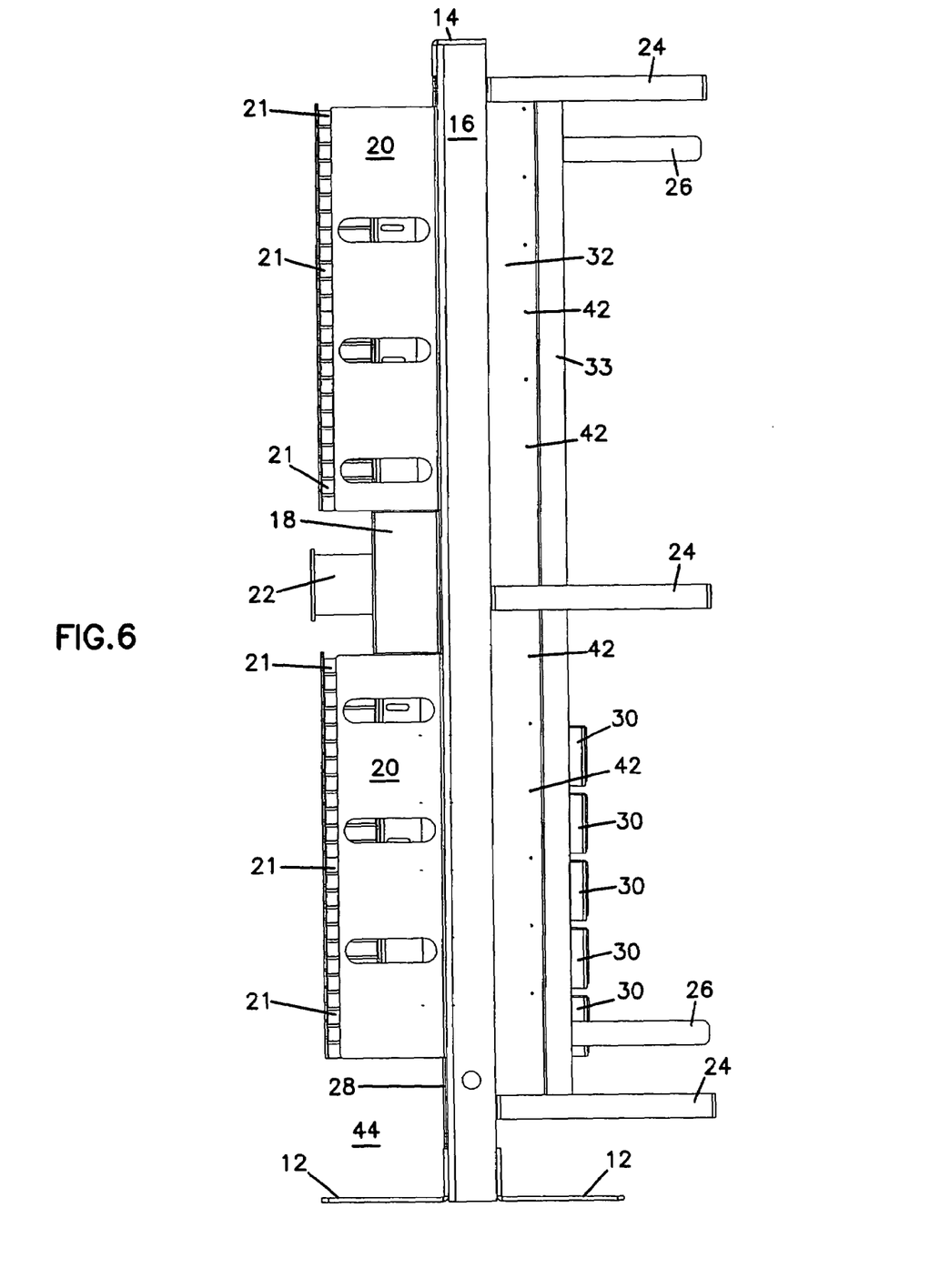
FIG. 6 is a side view of the telecommunications equipment rack of FIG. 1.
Figure 7:
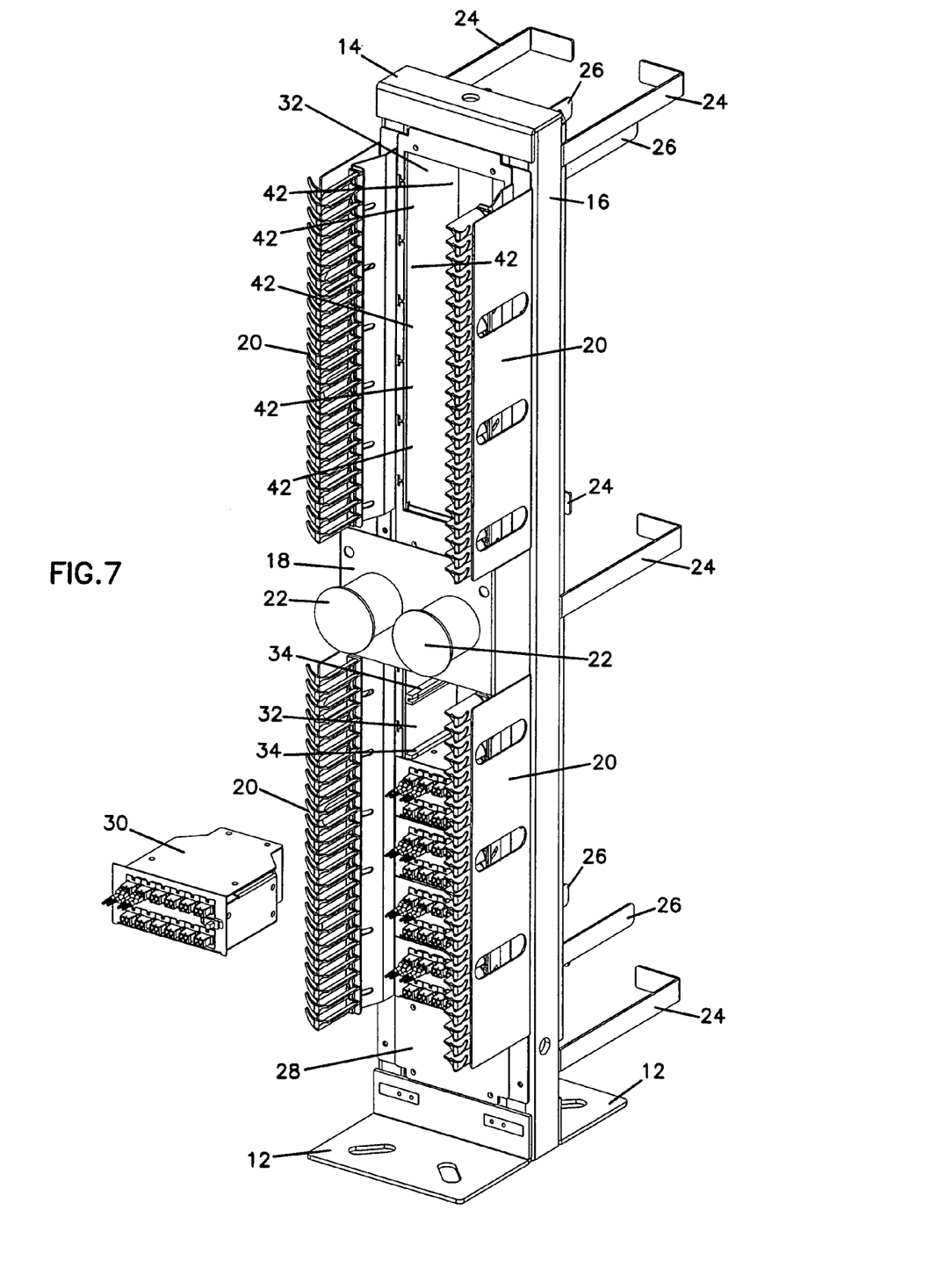
FIG. 7 is a front perspective view of the telecommunications equipment rack of FIG. 1 with a connection module shown in position for insertion into the rack.
Figure 8:
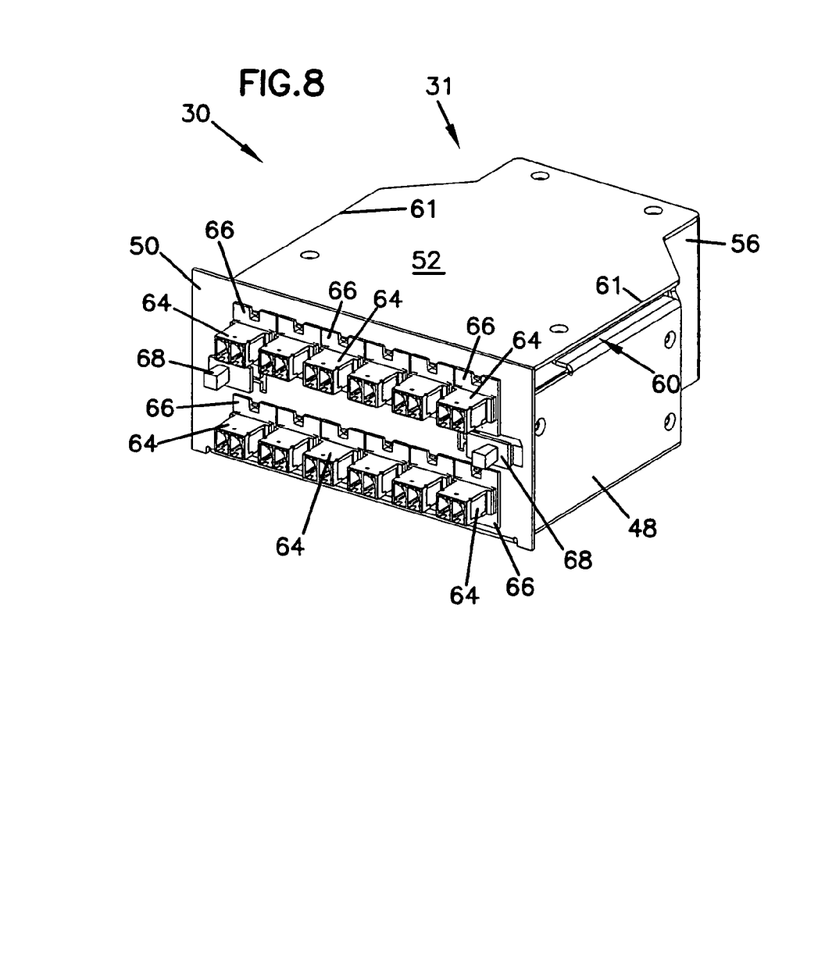
FIG. 8 is a front perspective view of the connection module of FIG. 7.
Figure 9:
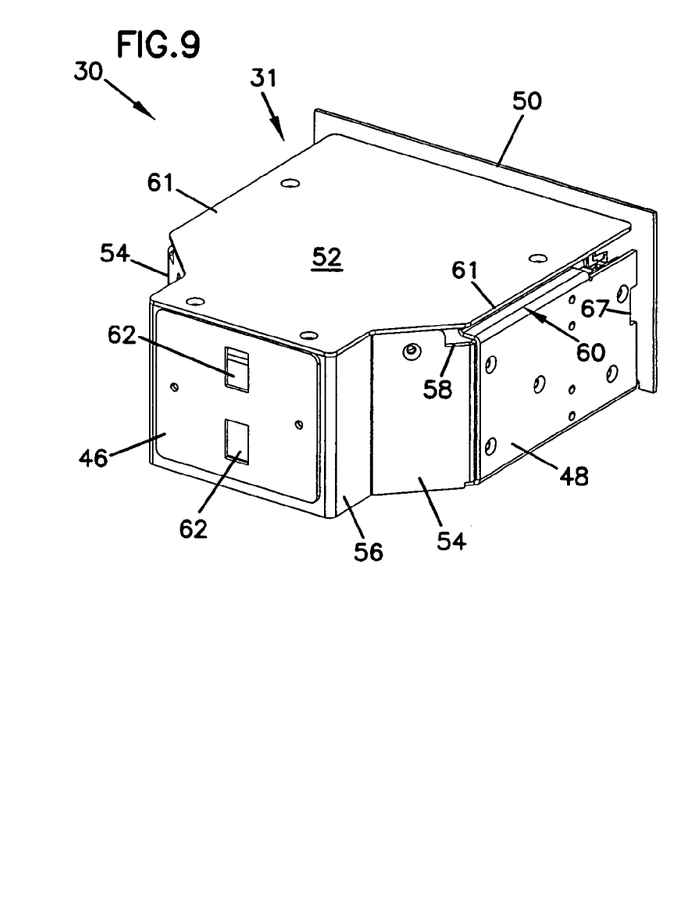
FIG. 9 is a rear perspective view of the connection module of FIG. 8.
Figure 10:
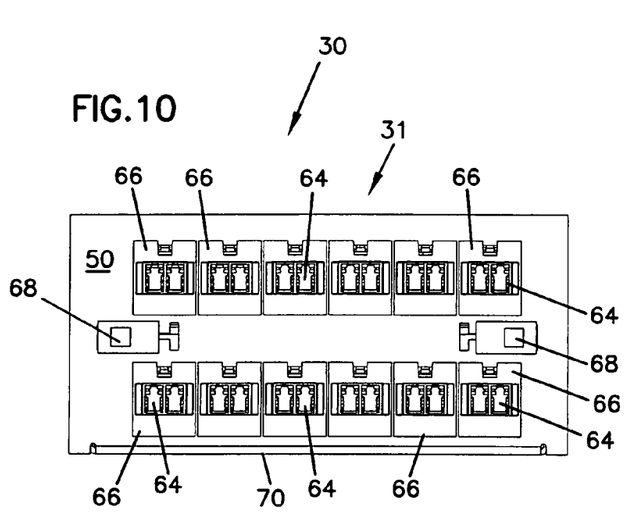
FIG. 10 is a front view of the connection module of FIG. 8.
Figure 11:
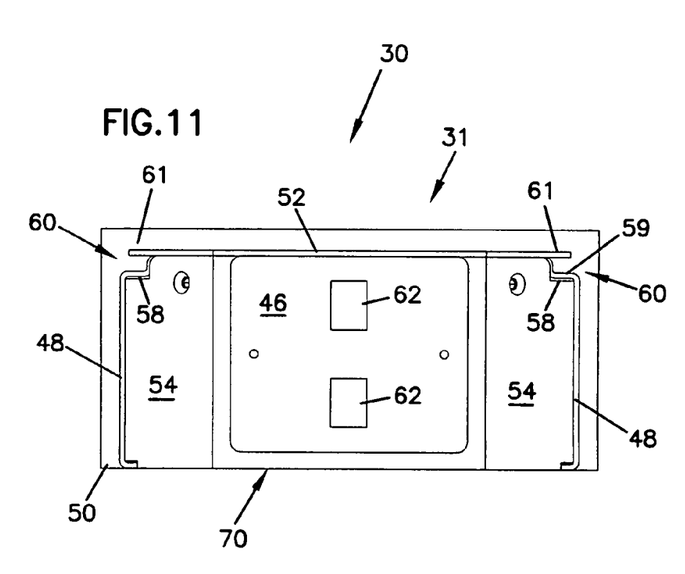
FIG. 11 is a rear view of the connection module of FIG. 8.
Figure 12:
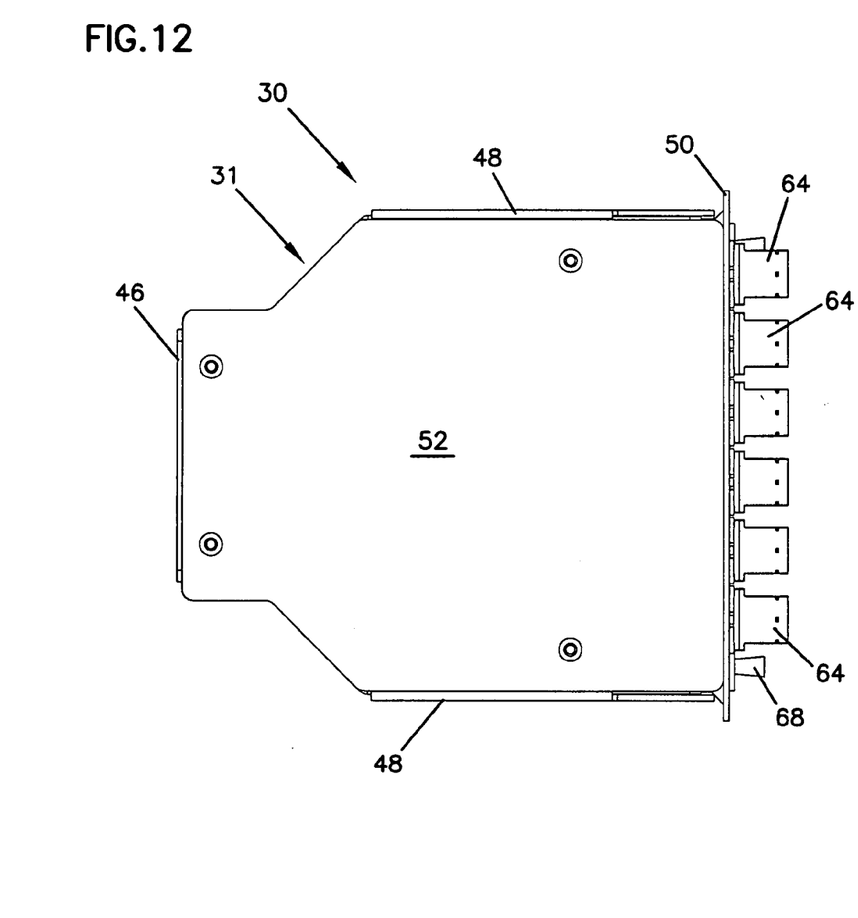
FIG. 12 is a top view of the connection module of FIG. 8.

As is shown in FIG. 5 and in FIGS. 11 through 15, modules 30 include a rear wall 46 which is narrower in width than the spacing of a pair of opposing side walls 48. Rear angled brackets 32 are shaped to generally match the shape of the rear of module 30. An angled portion 33 of rear bracket 32 allow inner brackets 26 to be positioned closer to each other and further in from outer brackets 24, providing more space within second vertical cable channels 38 for cables extending from devices mounted to adjacent or nearby equipment racks.

Mounted to an interior wall of each rear angled bracket 32 is a plurality of opposing mounting slides 34. Each pair of opposing mounting slides 34 defines a mounting location for a module 30. As shown in FIGS. 1 through 7, rack 10 includes six pairs of mounting slides 34 above crosspiece 18 and six pairs of mounting slides 34 below crosspiece 18, providing mounting locations for up to twelve modules 30. Mounting slides 34 may be mounted to rear angled brackets 32 by a variety of methods, such as welding or spot welding, bonding or gluing, or by fasteners such as rivets or screws extending through a plurality of openings 42. Alternative installation configurations of rack 10 might include two racks 10 stacked within a single gap 106 or 108 or similarly sized space, providing four groups of six pairs of mounting slides 34 and mounting positions for up to twenty-four modules 30. Between each group of six pairs of mounting slides 34, a crosspiece 18 with cable storage spools 22 may be mounted between vertical supports 16.

Below the lowermost module 30 is a plate 28 mounted between supports 16. Above front flange 12, below the lowest extension of side plates 20 and in front of plate 28 is defined a space 44 where a cable trough or some other cable management component might be mounted. Alternatively, a crosspiece 18 with slack storage spools 22 may also be mounted in space 44.

Referring now to FIGS. 8 through 15, module 30 is shown and described in greater detail. Module 30 includes a housing 31, which includes rear 46, opposing sides 48, a front 50, a top 52 and a bottom 70. As described above, rear 46 is narrower than the width between opposing sides 48. An angled wall 54 and a rear extension 56 connect each side 48 to rear 46. Top 52 and bottom 70 are shaped to extend to sides 48, angled walls 54, rear extensions 56, rear 46 and front 50. Formed in each side 48 is an inset 59, which in combination with an opening 58 in each angled wall 54 forms a mounting recess 60. Mounting recess 60 allows an outer lip 61 of top 52 to engage a mounting slide 34 in rack 10 and permit module 30 to be mounted to rack 10. One or more releasable latches 68 are positioned in front 50 to engage openings 69 (see FIGS. 1 and 3) of rack 10 to selectively secure module 30 to rack 10 and to permit removal of module 30. As shown, latches 68 are slide latches which extend through openings 67 in sides 48 to engage openings 69. It is anticipated that spring latches for latches 68. In rear 46 are at least one opening 62 for entry of telecommunications cables into an interior 80 of module 30.

Mounted to front 50 of module 30 is a plurality of telecommunications cable connection locations or adapters 64. As shown, adapters 64 are small format fiber optic adapters which are capable of optically connecting two pairs of fiber optic cable connectors 65. Each adapter 64 is mounted to front 50 by a releasable clip 66. The use of releasable clip 66 allows connectors 65 mounted to adapter 64 in interior 80 to be access while module 30 remains mounted to rack 10. By releasing clip 66 and pulling adapter 64 forward from front 50 to the extent that slack in the cable attached to the connectors 65 attached to the interior side of adapter 64, both sides of adapter 64 and connectors 65 attached to adapter 64 are accessible. Clip 66 as shown is adapted to be mounted to adapter 64 and then releasably mounted to front 50 so that it can be selectively detached from outside interior 80. Alternatively, clip 66 could be mounted to front 50 and releasably engage adapter 64. Adapters 64 and connectors 65 as shown are adapters and connectors described in U.S. Pat. No. 6,142,676, issued Nov. 7, 2000, the disclosure of which is incorporated herein by reference. Adapters 64 and connectors 65 conforming to other sizes and formats may be mounted to front 50 and used to connect telecommunications cables, including SC, FC, and other industry standard and proprietary formats. Such alternative connection locations 64 may connect optical fiber or copper cables and allow more or fewer connection locations than is shown in the FIGS.

It is anticipated that angled clips 66, such as those described in U.S. Pat. Nos. 5,214,735, issued May 25, 1993, and RE 34,955, issued May 30, 1995, the disclosures of which are incorporated herein by reference, may be used with adapters 64. This will allow adapters 64 in upper row 84 or lower row 86 to be directed to one or the other sets of cable protectors 21 of a rack 10, reducing the degree of bend required in cable attached to connectors 65 and improving bend radius protection.

Figure 13:
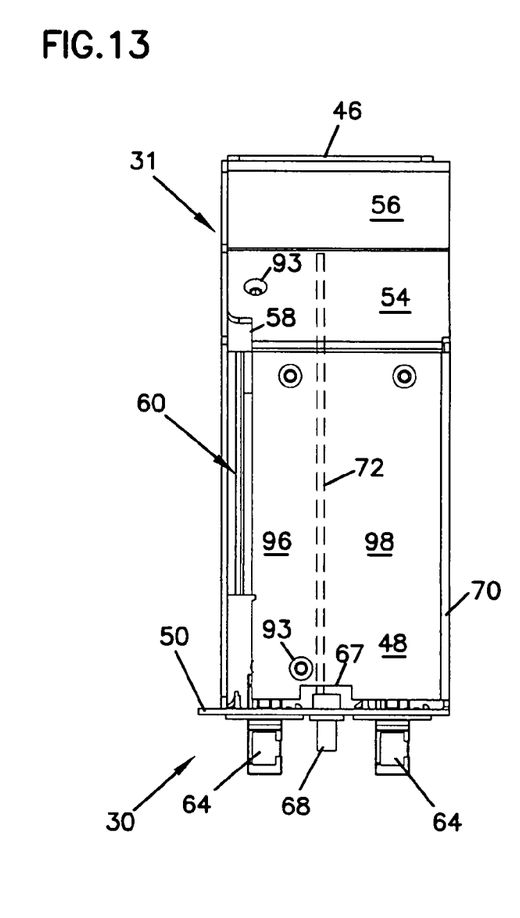
FIG. 13 is a side view of the connection module of FIG. 8 with an intermediate shelf within module 30 shown in hidden lines.
Figure 14:
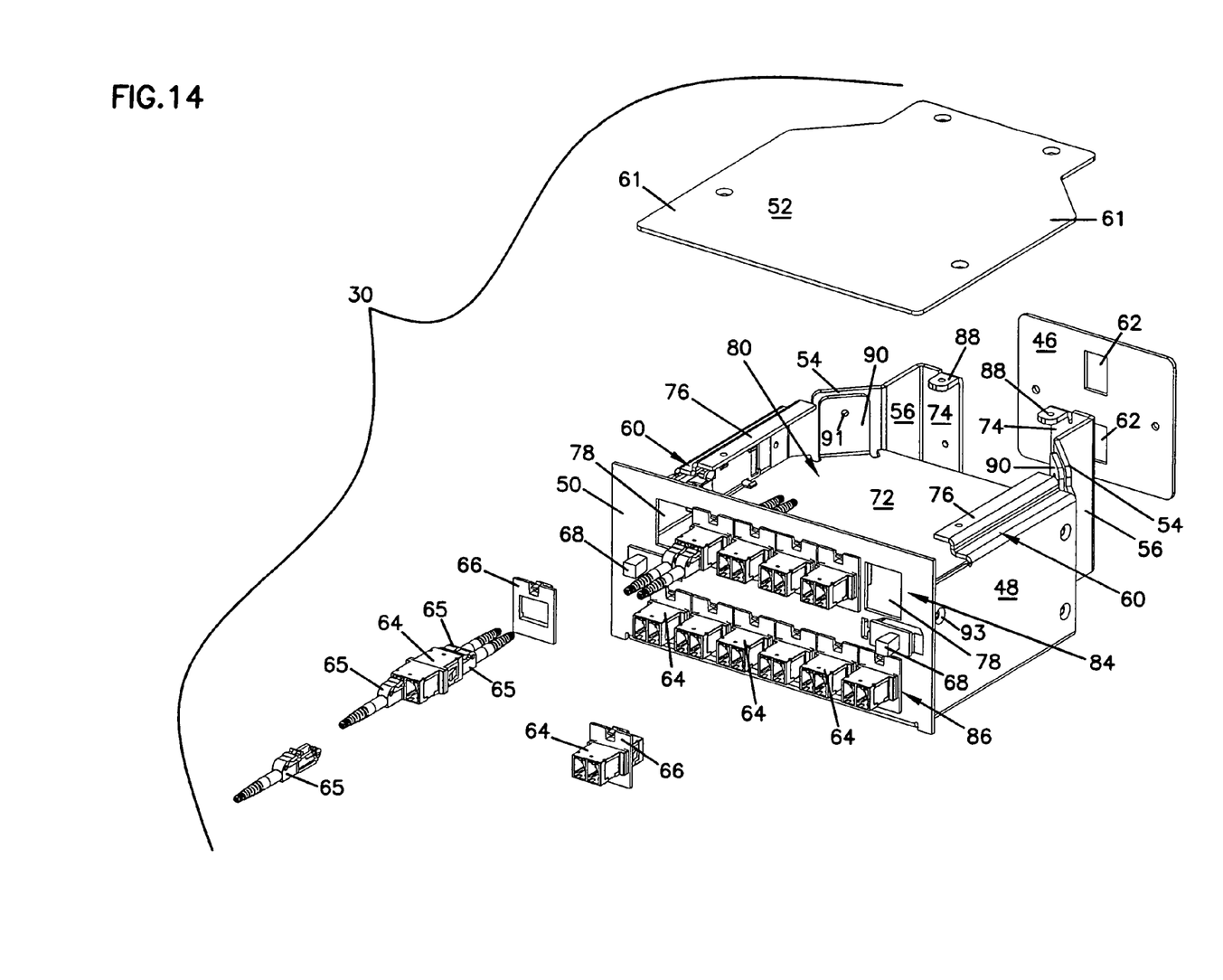
FIG. 14 is an exploded front perspective view of the connection module of FIG. 8.
Figure 15:
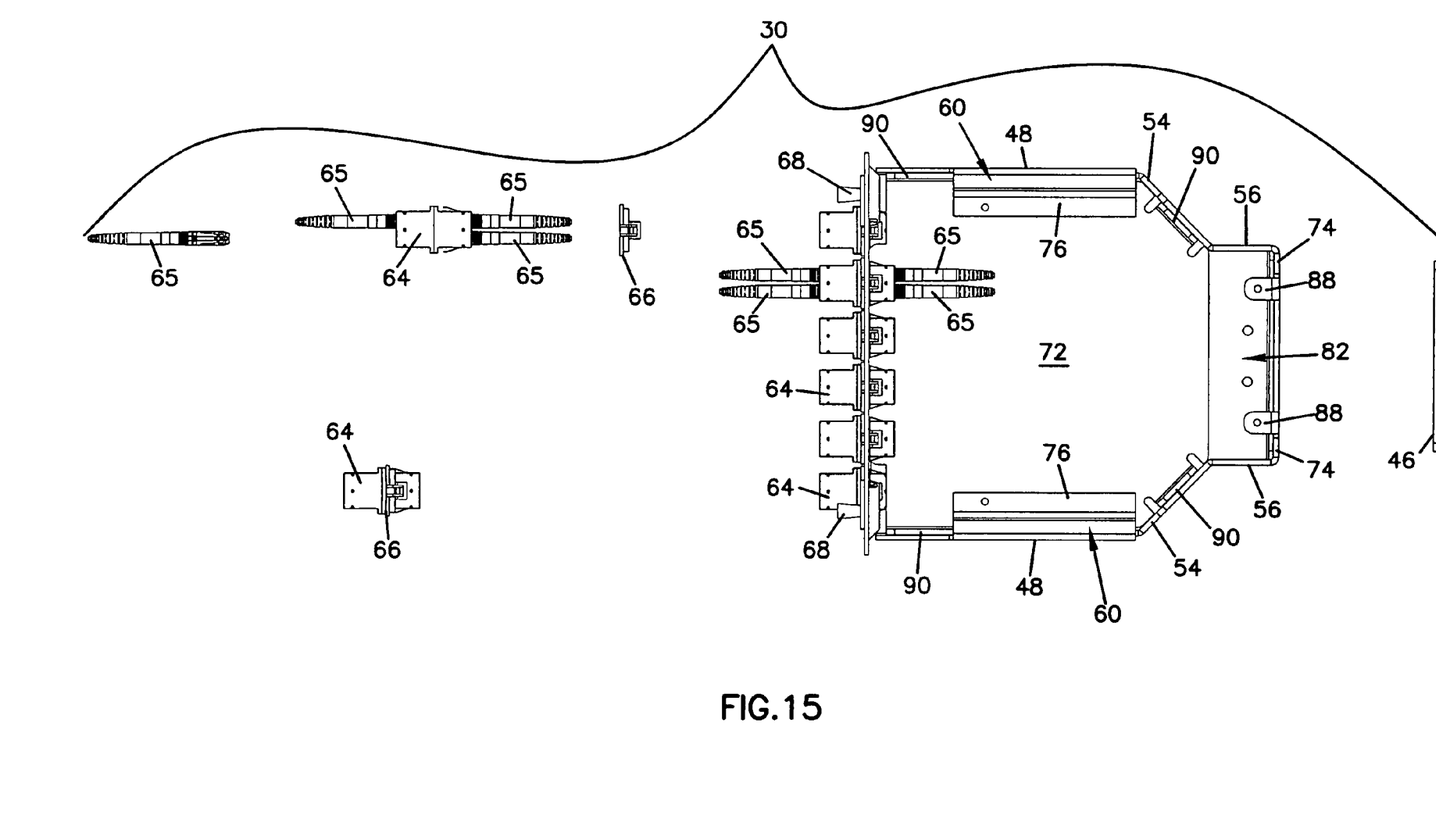
FIG. 15 is an exploded top view of the module of FIG. 14.

Referring now to FIGS. 13 through 15, a shelf 72 within interior 80 divides interior 80 into an upper space 96 and a lower space 98. Adapters 64 are mounted in a plurality of openings 78 in front 50 in two vertically spaced apart rows, an upper row 84 and a lower row 86. Shelf 72 is positioned approximately equally spaced between top 52 and bottom 70 and follows the interior shape of sides 48, front 50 and angled walls 54. However, shelf 72 does not extend as far rear as rear 46, leaving a gap 82 between the upper and lower spaces. Gap 82 allows a cable to enter interior 80 through either opening 62 and be directed into either upper space 96 or lower space 98. Alternatively, a gap allowing passage of cables between upper space 96 and lower space 98 may be provided through shelf 72 adjacent front 50. A cable directed into the upper space may be connected to any available adapter 64 in upper row 84, and a cable directed into the lower space may be connected to any available adapter 64 in lower row 86. Shelf 72 allows a cable entering either opening 62 to be directed into either the upper or lower space while providing separation of the cables within the upper and lower spaces to reduce tangling of the cables. Reduction of tangling is desirable as the limit of forward extension of adapter 64 when released from front 50 is limited by the amount of available slack in the cables attached to that adapter 64 within interior 80.

Recess 60 in each side 48 is formed by extension 76 which also provides a mounting flange for mounted top 52 to module 30. Rear 46 is mounted to module 30 at a pair of rear mounting flanges 74. Rear mounting flanges 74 also provide an additional pair of top mounting flanges 88. Shelf 72 includes a plurality of mounting flanges 90 including openings 91 through fasteners are inserted which engage openings 93 in angled walls 54 and sides 48 to position shelf 72 within interior 80.

As shown in the FIGS., module 30 is adapted to receive and optically connect optical fiber telecommunications cables at adapters 64. Twelve optical connections may be made in each of upper row 84 and lower row 86. The connectors 65 connected to the interior side of adapters 64 are connected to individual optical fiber cables. These individual cables may all be directed out of interior 72 through an opening 62 as individual cables or the individual cables may pass through a fanout 92 (not shown) within interior 72 and accumulated into a multiple strand optical fiber cable which extends from interior 72 through opening 62. Each of the types of cables extending from interior 72 through opening 62 enter first vertical cable channel 40 and directed to other telecommunications devices at the facility where rack 10 is installed. Alternatively, adapter 64 may allow the optical connection of multiple fiber cables at front 50, so that a multiple fiber cable, such as an MTP cable, entering interior 72 is not required to pass through fanout 92 prior to connecting to an adapter 64.

Openings 62 in rear 46 as shown are adapted to receive an adapter permitting the connection of an MTP multi-strand optical fiber cable in interior 80 with an MTP multi-strand optical fiber cable within vertical cable channel 40. This will permit module 30 to be preloaded with adapters in openings 78 and 62, with an MTP cable leading to fanout 92 in interior 80 and optical fiber cables including a single strand of optical fiber extending from fanout 92 to adapter 64. This pre-loading of module 30 allows for simpler installation of module 30 to rack 10 and completion of telecommunications equipment connections through module 30.

Openings 62 in rear 46 may also be adapted to receive an IFC multi-strand optical fiber cable. In addition, a cable clamp 94 (not shown) would be mounted within interior 80 and the IFC cable would extend through cable clamp 94 before entering fanout 92 to be separated into individual optical fiber cables. It is anticipated that further additional devices may be mounted in interior 80 and connected to optical fiber cables entering through rear 46. These devices may include splitters, such as described in U.S. Pat. No. 5,432,875, issued Jul. 11, 1995, the disclosure of which is incorporated herein by reference, wavelength division multplexers, or other devices which aid in the separation of individual optical fibers or data streams within the cables entering through rear 46.

As shown in the FIGS., adapters 64 are mounted in rows. Cables connected to adapters 64 may be organized to and directed into one of front cable channels 23 based on designated function or use. For ease of installation and operation, and to allow for future expansion, adapters 64 in alternating rows may be designated as in-use for connection to cables linked to devices or equipment currently in service, and reserve for connection to cables designated for future expansion or for temporary use during maintenance or repair. Following this designation and direction approach, all cables connected to in-use devices are directed into one front cable channel 23 and all cables connected to reserve or future expansion devices are directed into the other front cable channel 23. Spools 22 positioned adjacent front cable channels 23 could be similarly designated to receive either in-use or reserve cable slack.

With regard to the foregoing description, it is to be understood that changes may be made in detail, especially in matters of the construction materials employed and the shape, size and arrangement of parts without changing the scope of the present invention. It is intended that the specification and the depicted aspects be considered exemplary only, with the true scope and spirit of the invention being indicated by the broad meaning of the following claims.

What is claimed is as follows:

1. A telecommunications connection module comprising:
a housing with a front face, a rear face, a top, a bottom and opposing sides, defining an interior;
the front face including a plurality of connection locations for connecting a plurality of first optical fiber telecommunications cables of a first side of the front face with a plurality of second optical fiber telecommunications cables of a second side of the front face;
each of the connection locations being removably mounted to the front face so that an interior side of each connection location is accessible from outside the interior;
the plurality of connection locations arranged into a first row and a second vertically spaced apart row of connection locations, the connection locations including fiber optic adapters for connecting two fiber optic connectors in axial alignment;
an intermediate shelf within the interior positioned between the top and the bottom and dividing the interior into a first space and a second space, the shelf positioned so that a cable of the plurality of second optical fiber telecommunications cables placed in the first space may be connected to one of the connection locations in the first row and a cable of the plurality of second optical fiber telecommunications cables placed in the second space may be connected with one of the connection locations in the second row, wherein sufficient slack is provided in the cables placed in the first and second spaces of the interior so that each connection location may be released from the front face and extended away from the interior to permit access to the interior side of the connection location and to a cable of the plurality of second optical fiber telecommunications cables.

2. The telecommunications connection module of claim 1, wherein the first and second telecommunications cables each include a single optical fiber.

3. The telecommunications connection module of claim 1, wherein the first and second telecommunications cables each include multiple optical fibers and the connection locations optically connect each optical fiber in the first cable with an optical fiber in the second cable.

4. The telecommunications connection module of claim 1, wherein a cable of the plurality of the second telecommunications cables includes a plurality of optical fibers, a cable of the plurality of the first telecommunications cables includes a single optical fiber and a fanout is mounted within the interior to divide the cable of the plurality of the second telecommunications cables into individual optical fibers for connection with the single optical fiber of the cable of the plurality of the first telecommunications cables.

5. The telecommunications connection module of claim 1, wherein the top and opposing sides of the housing cooperate to form an integral mounting recess in each side so that the housing may be mounted to a telecommunications equipment rack including slides for receiving an edge of the top adjacent the mounting recess, access to the mounting openings being provided by a pair of openings in the rear of the housing.

6. The telecommunications connection module of claim 1, wherein the rear of the housing is removably mounted to the housing and includes a first opening allowing a telecommunications cable to extend into the first space and a second opening allowing a telecommunications cable to extend into the second space.

7. The telecommunications connection module of claim 1, wherein the connection locations are removably mounted to the front of the housing and adapted for removal from outside the interior of the module.

8. A telecommunications connection module comprising:
a housing with a front face, a rear face, a top, a bottom and opposing sides, defining an interior;
the front face including a plurality of connection locations for connecting a first telecommunications cable of a first side of the front face with a second telecommunications cable of a second side of the front face;
each of the connection locations being removably mounted to the front face so that an interior side of each connection location is accessible from outside the interior;
the top and opposing sides of the housing cooperating to form an integral mounting recess in each side so that the housing may be mounted to a telecommunications equipment rack including slides for receiving an edge of the top adjacent the recess.

9. The telecommunications connection module of claim 8, wherein the plurality of connection locations are arranged into a first row and a second row of connection locations, an intermediate shelf is positioned within the interior positioned between the top and the bottom and dividing the interior into a first space and a second space, the shelf positioned so that a first telecommunications cable placed in the first space may be connected to one of the connection locations in the first row and a second telecommunications cable placed in the second space may be connected with one of the connection locations in the second row.

10. The telecommunications connection module of claim 9, wherein the shelf defines at least one opening between the first space and the second space allowing cables within the first space to be directed into the second space.

11. The telecommunications connection module of claim 8, wherein the connection locations are removably mounted to the front of the housing and adapted for removal from outside the interior of the module.

12. A telecommunications connection module comprising:
a housing with a front face, a rear face, a top, a bottom and opposing sides, defining an interior;
the front face including a plurality of connection locations for connecting a first telecommunications cable of a first side of the front face with a second telecommunications cable of a second side of the front face;
each of the connection locations being removably mounted to the front face so that an interior side of each connection location is accessible from outside the interior;

a portion of the rear of the housing being removably mounted to the housing and including an opening allowing a telecommunications cable to extend into the interior;

the rear of the housing including angled portions adjacent the sides which are offset toward the front of the housing.

13. The telecommunications connection module of claim 12, wherein the plurality of connection locations are arranged into a first row and a second row of connection locations, an intermediate shelf is positioned within the interior positioned between the top and the bottom and dividing the interior into a first space and a second space, the shelf positioned so that a first telecommunications cable placed in the first space may be connected to one of the connection locations in the first row and a second telecommunications cable placed in the second space may be connected with one of the connection locations in the second row.

14. The telecommunications connection module of claim 13, wherein the opening in the rear is a first opening positioned so that cables inserted through the first opening enter the first space, and the rear also includes a second opening positioned so that cables inserted through the second opening enter the second space.

15. The telecommunications connection module of claim 13, wherein the shelf defines at least one opening between the first space and the second space allowing cables within the first space to be directed into the second space.

16. The telecommunications connection module of claim 12, wherein the top and opposing sides of the housing cooperate to form an integral mounting recess in each side so that the housing may be mounted to a telecommunications equipment rack including slides for receiving an edge of the top adjacent the mounting recess, access to the mounting recesses being provided by a pair of openings in the angled offset portions of the rear of the housing.

17. A telecommunications connection system comprising:
an equipment rack including a base, a top and two vertical supports extending between the top and the base, the supports including a plurality of mounting locations and being positioned adjacent opposing sides of the rack;
at least one connection module mounted to one of the mounting locations, the connection module including:
a front, a rear and opposing sides defining an interior;
the front including a plurality of connection locations for connecting a first telecommunications cable within the interior and a second telecommunications cable outside the interior; and
the rear including at least one cable access opening for the first telecommunications cable to enter the interior;
a first cable management structure adjacent a rear of the equipment rack defining a first vertical cable channel adapted to direct the first telecommunications cable to the rear of the connection module and at least one second vertical cable channel for managing telecommunications cables not connected to modules on the equipment rack;
a second cable management structure adjacent a front of the equipment rack adapted to direct the second telecommunications cable from the connection module, the cable management structure adjacent the front of the equipment rack defining at least one third vertical cable channel.

18. The telecommunications connection system of claim 17, wherein the at least one cable openings in the rear of the housing are generally equidistant from the sides of the housing and first vertical cable channel is directly behind the openings.

19. The telecommunications connection system of claim 18, wherein two second vertical cable channels are included in the first cable management structure, extending the rear of the housing on opposite sides of the first vertical cable channel.

20. The telecommunications connection system of claim 17, wherein the equipment rack is adapted to fit within a cable management bay of a telecommunications installation, the installation including a plurality of existing equipment racks to which are mounted a plurality of telecommunications connection and switching modules, and a plurality of telecommunications cables extending to and away from the modules of the existing equipment racks.

21. The telecommunications connection system of claim 17, wherein a plurality of connection modules are mounted to the equipment rack.

22. The telecommunications connection system of claim 21, wherein the plurality of connection locations are arranged in a plurality of rows and each connection module includes at least one row of connection locations, the second cable management structure includes two front vertical cable channels positioned adjacent the both of the vertical supports, and first telecommunications cables connected to the connection locations in one of the rows are directed into one of the front vertical cable channels and first telecommunications cables connected to connection locations in immediately adjacent rows are directed into the other front vertical cable channel.

23. The telecommunications connection system of claim 17, wherein the plurality of connection locations of the module are arranged into a first row and a second row of connection locations on the front of the module.

24. The telecommunications connection system of claim 23, wherein an intermediate shelf is mounted within the interior of the module defining a first space and a second space within the interior so that a first telecommunications cable entering the interior through a first opening in the rear is directed into the first space and connected a connection location in the first row of connection locations and a second first telecommunications cable entering the interior through a second opening in the rear is directed into the second space and connected to a connection location in the second row of connection locations.

25. The telecommunications connection system of claim 17, wherein the second telecommunications cable includes a single optical fiber.

26. The telecommunications connection system of claim 25, wherein the first telecommunications cable includes a single optical fiber and the connection locations are adapted to optically connect the optical fiber of each first telecommunications cable with the optical fiber of each second telecommunications cable.

27. The telecommunications connection system of claim 25, wherein the first telecommunications cable includes a plurality of optical fibers, the interior includes a fanout which separates the first telecommunications cable into individual optical fibers and the connection locations are adapted to optically connect the optical fiber of the second telecommunications cable with one of the optical fibers of the first telecommunications cable.

28. The telecommunications connection system of claim 17, wherein the first and second telecommunications cables each include a plurality of optical fibers and the connection locations are adapted to optically connect each optical fiber in the first telecommunications cable with an optical fiber in the second telecommunications cable.

29. The telecommunications connection system of claim 17, wherein the second cable management structure provides bend radius protection to cables extending from the connection locations of the connection module.

30. A method of adding an equipment rack to a telecommunications equipment installation comprising the steps of:
providing the telecommunications equipment installation with a plurality of existing equipment racks mounted in at least one row, a plurality of telecommunications devices installed on the existing equipment racks, and a plurality of cables extending from the devices mounted to the existing equipment racks;
selecting a gap in the row, the gap being narrower than the existing equipment racks;
installing a new equipment rack within the gap in the row, the new equipment rack including a first and a second vertical cable channel structure located adjacent a rear of the new equipment rack;
placing the plurality of telecommunications cables extending from the devices mounted to the existing equipment racks into the second vertical cable channel structure of the new equipment rack;
mounting telecommunications devices to the new equipment rack and leading telecommunications cables within the first vertical cable channel structure to the devices mounted to the new equipment rack.

31. The method of claim 30, wherein the new equipment rack is between approximately six inches and approximately eight inches in width.

32. The method of claim 31, wherein mounted within the gap is an existing vertical cable channel structure and the cables connected to the devices on the existing telecommunications racks are lead from the devices into the cable channel structure, the method further including the step of removing the existing vertical cable channel structure prior to installing the new equipment rack within the gap.

* * * * *